United States Patent [19]

Yankloski

[11] Patent Number: 5,767,452

[45] Date of Patent: Jun. 16, 1998

[54] MAILING MACHINE

[75] Inventor: Richard A. Yankloski, Webster, N.Y.

[73] Assignee: Data Pac Mailing Systems Corp., Webster, N.Y.

[21] Appl. No.: 573,169

[22] Filed: Dec. 15, 1995

[51] Int. Cl.$^6$ .......... G01G 19/22; G01G 23/38; G01G 19/00; B65H 5/00

[52] U.S. Cl. .......... 177/25.11; 177/145; 177/25.13; 177/2; 271/10.01; 271/2

[58] Field of Search .......... 177/2, 4, 25.11, 177/25.12, 25.13, 119, 122, 145, 254, 8, 9, 10; 271/10.01, 10.03, 10.09, 110, 121, 122, 124, 177, 180, 2

[56] References Cited

U.S. PATENT DOCUMENTS

| | | | |
|---|---|---|---|
| 2,368,519 | 1/1945 | Burckhardt et al. | 271/2 |
| 2,381,853 | 8/1945 | Bombard | 271/2 |
| 3,782,541 | 1/1974 | Wood | 299/73 |
| 3,966,193 | 6/1976 | Storace et al. | 271/150 |
| 4,061,329 | 12/1977 | Sechuk et al. | 271/10.01 |
| 4,488,610 | 12/1984 | Yankloski | 177/4 |
| 4,516,209 | 5/1985 | Scribner | 364/466 |
| 4,546,963 | 10/1985 | Dinnissen | 271/35 |
| 4,688,678 | 8/1987 | Zue et al. | 209/552 |
| 4,742,878 | 5/1988 | Freeman et al. | 177/25.11 |
| 4,865,139 | 9/1989 | Cohen et al. | 177/4 |
| 4,893,249 | 1/1990 | Silverberg | 364/464.03 |
| 4,923,022 | 5/1990 | Hsieh | 177/4 |
| 4,973,037 | 11/1990 | Holbrook | 271/2 |
| 5,044,452 | 9/1991 | Rand et al. | 177/2 |
| 5,147,048 | 9/1992 | Signoretto | 209/698 |
| 5,163,669 | 11/1992 | Hurd et al. | 271/125 |
| 5,191,196 | 3/1993 | Mercede et al. | 235/484 |
| 5,238,143 | 8/1993 | Crighton | 271/2 |
| 5,244,197 | 9/1993 | Helmstüdter | 271/121 |
| 5,340,097 | 8/1994 | Yankloski | 271/10 |

*Primary Examiner*—Michael L. Gellner
*Assistant Examiner*—Randy W. Gibson
*Attorney, Agent, or Firm*—M. Lukacher; K. Lukacher

[57] ABSTRACT

An automatic mail processing machine includes modular mail processing stations for: 1) stacking and feeding envelopes, 2) weighing envelopes, and 3) applying indicia to the envelopes. The modules of the mail processing machine are linearly disposed with respect to each other. The array of modules configure an automatic mailing machine which requires a small amount of space. The automatic mailing machine may be used to process envelopes of mixed weights and sizes without undue and costly procedures being performed to the machine. The mailing machine may further be utilized to process envelopes of similar sizes and shapes without requiring that each envelope be individually weighed.

35 Claims, 14 Drawing Sheets

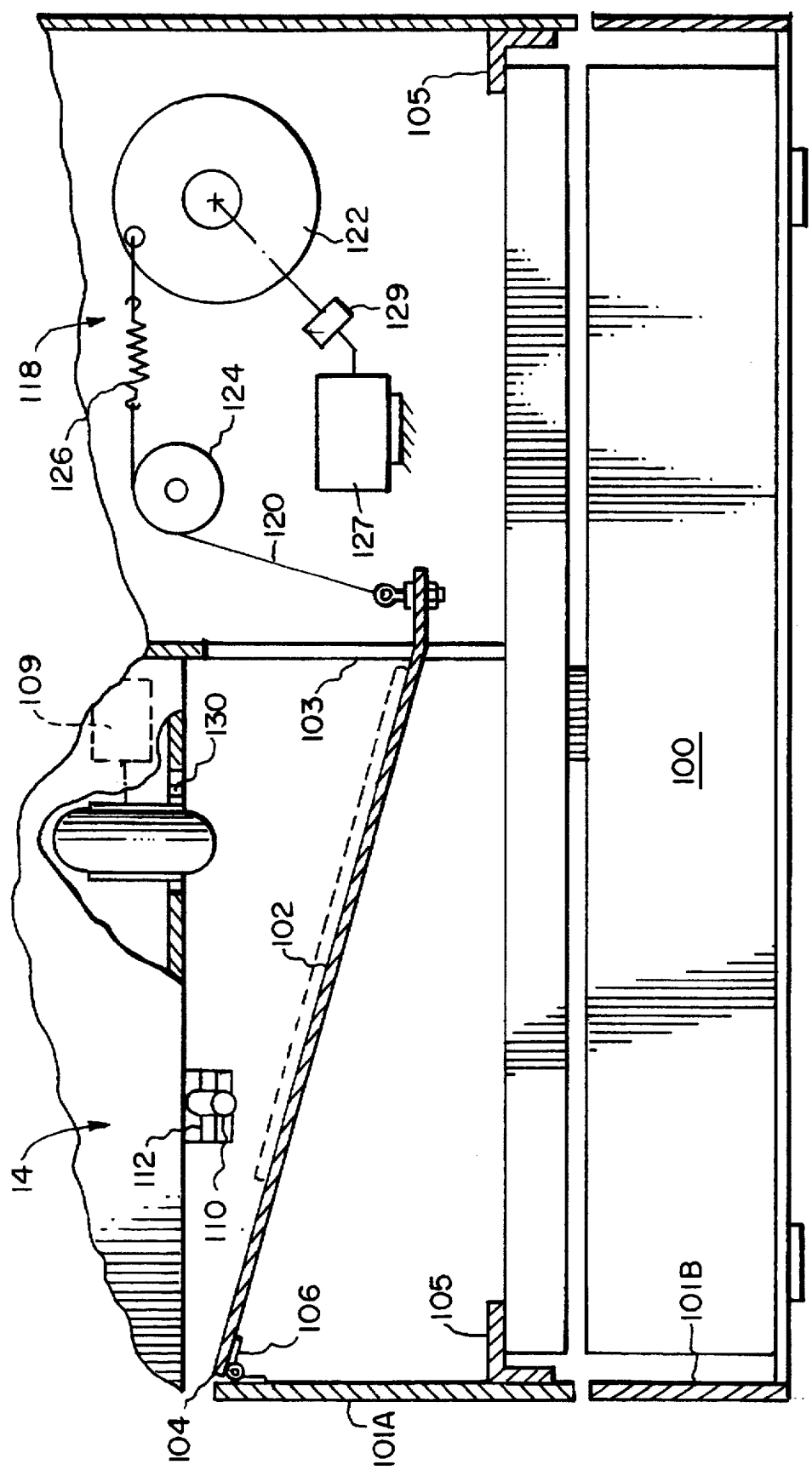

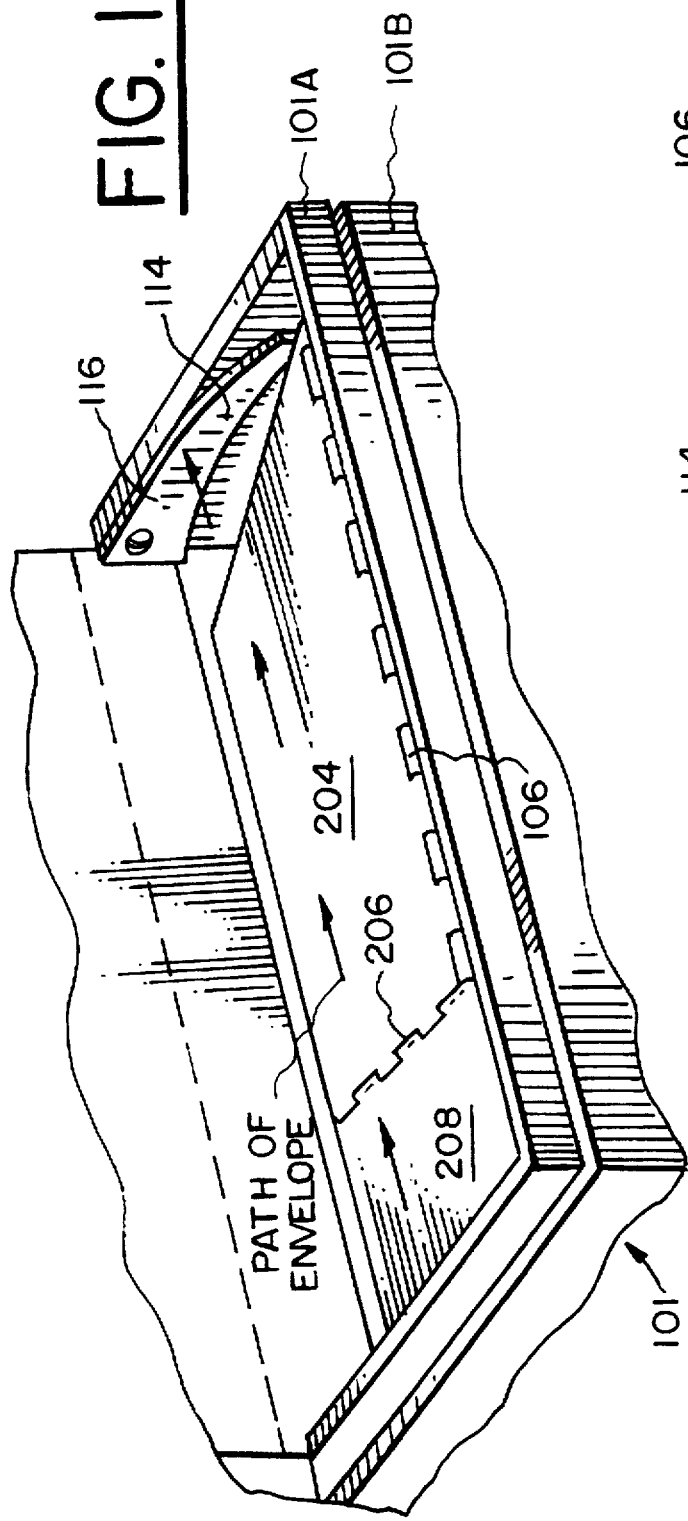
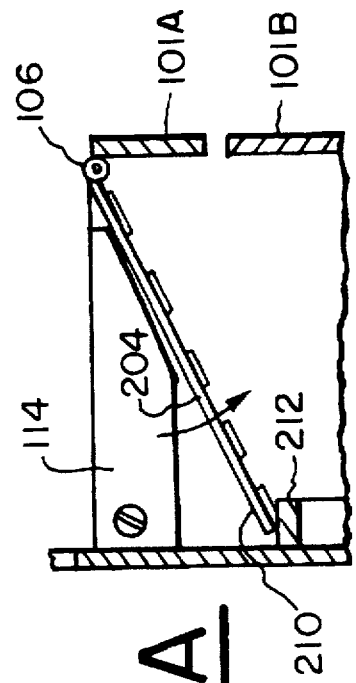

MAILING MACHINE

DESCRIPTION

The present invention relates to a mailing machine, and more particularly, to a mailing machine having modular mail processing stations arranged linearly for transporting individual pieces of mail, generally in the form of envelopes of varying size, from a vertical stack to a weighing station where pieces of mail are individually registered and weighed, if necessary, and thereafter to a printing station where appropriate data, such as postage, bar codes or addresses is applied.

The modules configure the mailing machine to occupy a minimum amount of floor space and, therefore, presents a compact device capable of inclusion in small office environments.

In the past, mail processing machines have been rather large in dimension and, accordingly, have occupied a considerable amount of floor space. Further, previous mail processing machines have generally not addressed the problem of processing mail, such as envelopes, of mixed sizes and weights without performing complicated and time consuming adjustments to the machine. In many instances, in order to process envelopes of mixed sizes and weights, it was necessary to install changes to mailing equipment specifically designed for such use. Obviously the cost incurred in performing such changeover was prohibitive for some users. Compact mail processing machines have been known in the part, such as, for example, applicant's own mailing machines, as disclosed in U.S. Pat. No. 5,340,097 issued Aug. 23, 1994 and U.S. patent application Ser. No. 08/294,122 filed Aug. 22, 1994. However, while these mailing machines are compact, they are not composed of separate modules for stacking and feeding of envelopes; weighing the envelopes; and applying pertinent indicia such as postage, etc. to the envelopes. Further, the components of these machines are not arranged so that envelopes being processed are fed along a linear path without changing directions. Additional, mail processing machines, which represent the general state of the art, are shown in U.S. Pat. Nos. 3,782,541; 4,488,610; 4,516,209; 4,688,678; 4,893,249; 4,923,022; 4,973,037; 5,147,048; 5,163,669, and 5,191,196.

It is an object of the present invention to provide an improved machine for processing mail configured compactly of modular units.

It is another object of the present invention to provide an improved compact modular mail processing machine wherein the modules are linearly disposed with respect to each other.

It is a still further object of the present invention to provide an improved mail processing machine having a module capable of automatically processing envelopes of varying sizes and weights for weighing and/or the application of postage and other indicia.

It is a still further object of the present invention to provide an improved module for mail processing having separating cams and fingers to prevent feeding more than one envelope along an envelope path to weighing and indicia application stations.

Briefly described, a mail processing machine embodying the invention is comprised of individual modules which configure the modules into a compact mailing machine. The compact modular mail processing machine comprises separate modules arranged along a linear path for: 1) feeding mail in the form of envelopes from a generally vertical stack; 2) weighing individual envelopes delivered from the envelope stack; and 3) applying appropriate indicia (such as bar codes, postage, and other data) to each envelope, all while the envelopes are moved individually and sequentially along the linear path.

The modular mail processing machine of the present invention may process envelopes of mixed sizes and weights without external adjustments or operator interfacing. Further, the modular mail processing machine of the invention may automatically process envelopes of the same size and weight directly through the weighing station and onto the indicia applying station without performing lengthy and laborious changes to the apparatus itself.

The forgoing and other objects, features and advantages of the invention, as well as the presently preferred embodiments thereof, will become more readily apparent from a reading of the following description in connection with the accompanying drawings in which:

FIG. 8 is a sectional view taken along line 8—8 of FIG. 6 showing the weigh scale pivot plate of the weighing and transport module in a first operating position;

FIGS. 9–11A schematically illustrate the weighing and transport module configured to handle envelopes which do not require weighing.

Figure 1:
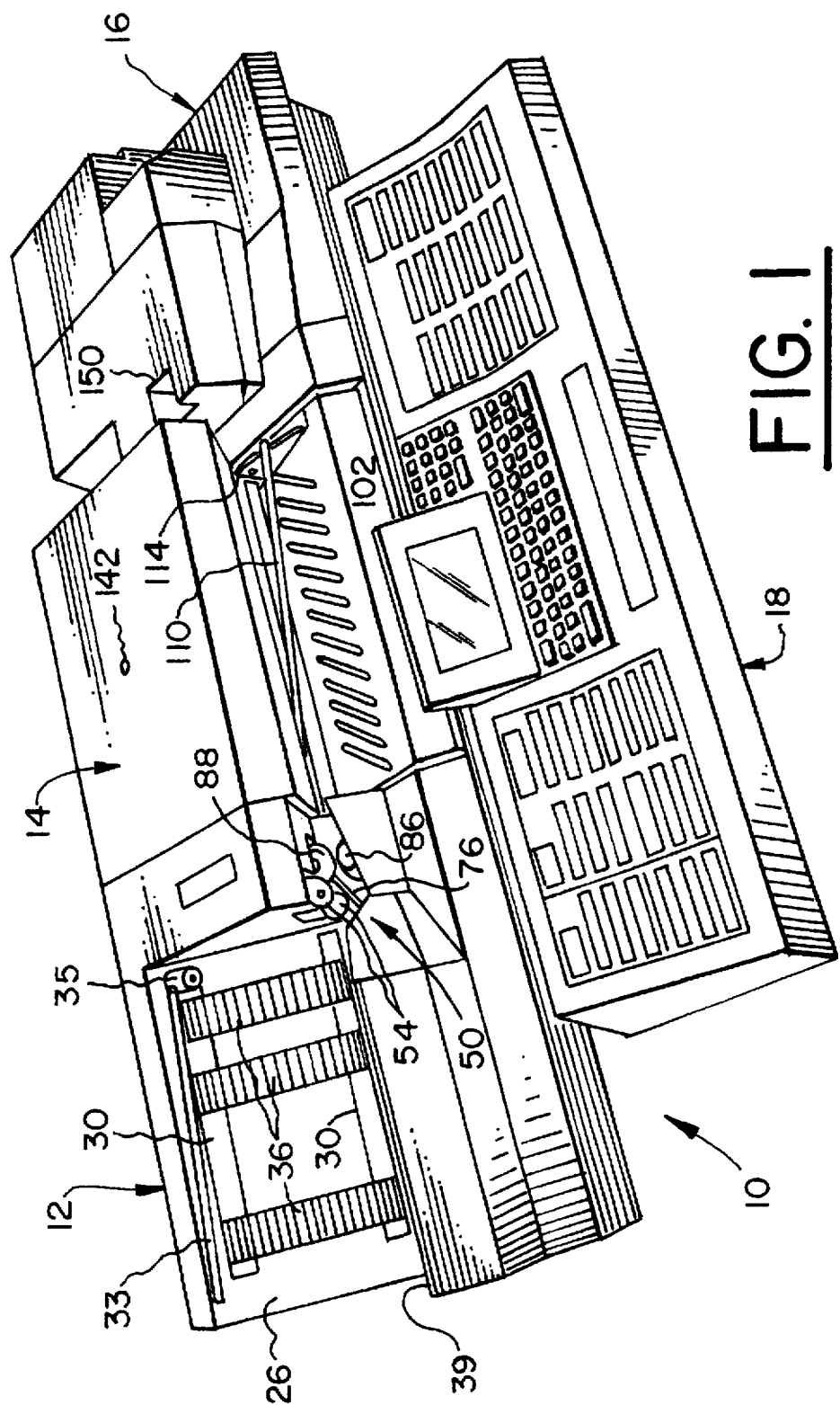
FIG. 1 is a top perspective view of a compact, modular mail processing machine according to the present invention.

As illustrated in FIG. 1, the automatic mail processing machine 10 of the present invention generally includes an envelope stacking and feeder module 12, an envelope weighing and transport module 14 and a printing module 16 for applying appropriate indicia (such as postage, bar codes, etc.) to the envelopes processed from the first two modules. A computer keyboard console,or terminal, 18 provides a further module, which for convenience, is centered directly in front of the three modules 12, 14 and 16. The relative positions of each of the modules 12, 14, 16 and 18 configure a compact automatic mail processing machine 10 wherein mail, such as envelopes, are processed in a straight line initially from module 12 through the weighing module 14, and on to the printing module 16. The feeder, weighing and printing modules 12, 14 and 16 define stations where the mail (envelopes) is processed. The modules are arranged so as to define a linear path along which the envelopes pass as each envelope is being processed (fed, weighed and marked).

The envelope stacking and feeder station 12, as best illustrated in FIGS. 2–5A, comprises a housing 20 having a V-shaped envelope support tray 22, having sides (or legs) 26 and 39, for supporting a stack of envelopes 24 thereon. The envelopes may be of mixed sizes (e.g., 3"×5"–10"×13") and weights (e.g., 1 oz.–11 oz.), and randomly disposed in the envelope stack without concern for any particular size/weight groupings. One leg 26 of V-shaped support tray 22 includes a pair of spaced-apart longitudinal apertures, or slots, 28. Belt drive rollers 30 are positioned within the longitudinal apertures 28. The rollers are journalled in housing 20. Each roller 30 is journalled in a bearing (not shown). One of the rollers 30 is coupled to an electric motor 32 for rotation thereof. Friction belts 36 are mounted between rollers 30 such that the top surface 38 of each is exposed through and rides on leg 26 of V-shaped support tray 22. A lever arm 33 is pivotably fixed to leg 26 at one corner, thereof. A weighted roller 35 is rotatably fixed to lever arm 33 at the opposite end thereof. The outlet end of the module 12 is on the right and the middle belt is closer to the outlet end to provide greater support for the stack during envelope separation.

Figure 5:
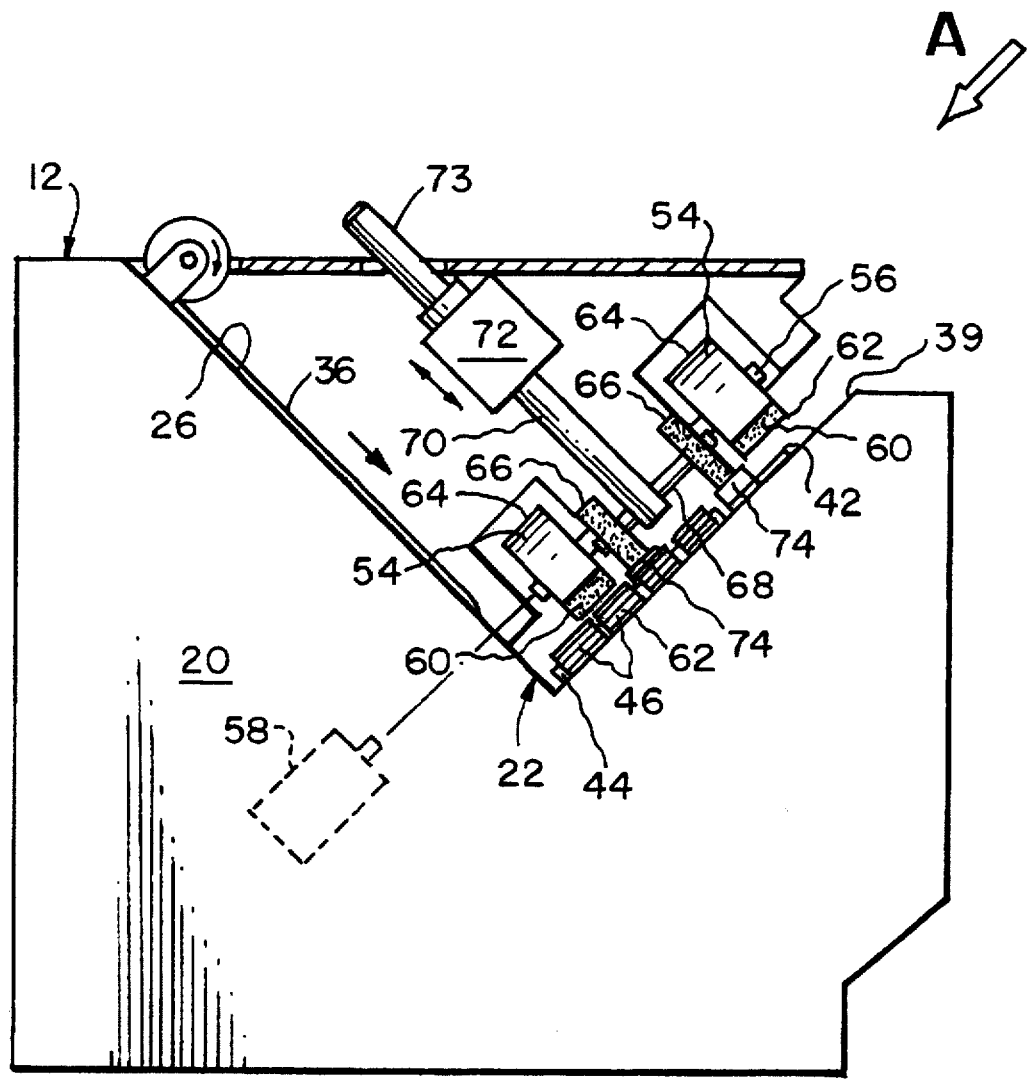
FIG. 5 is a view similar to FIG. 4 wherein a protective cover plate has been removed.
Figure 5A:
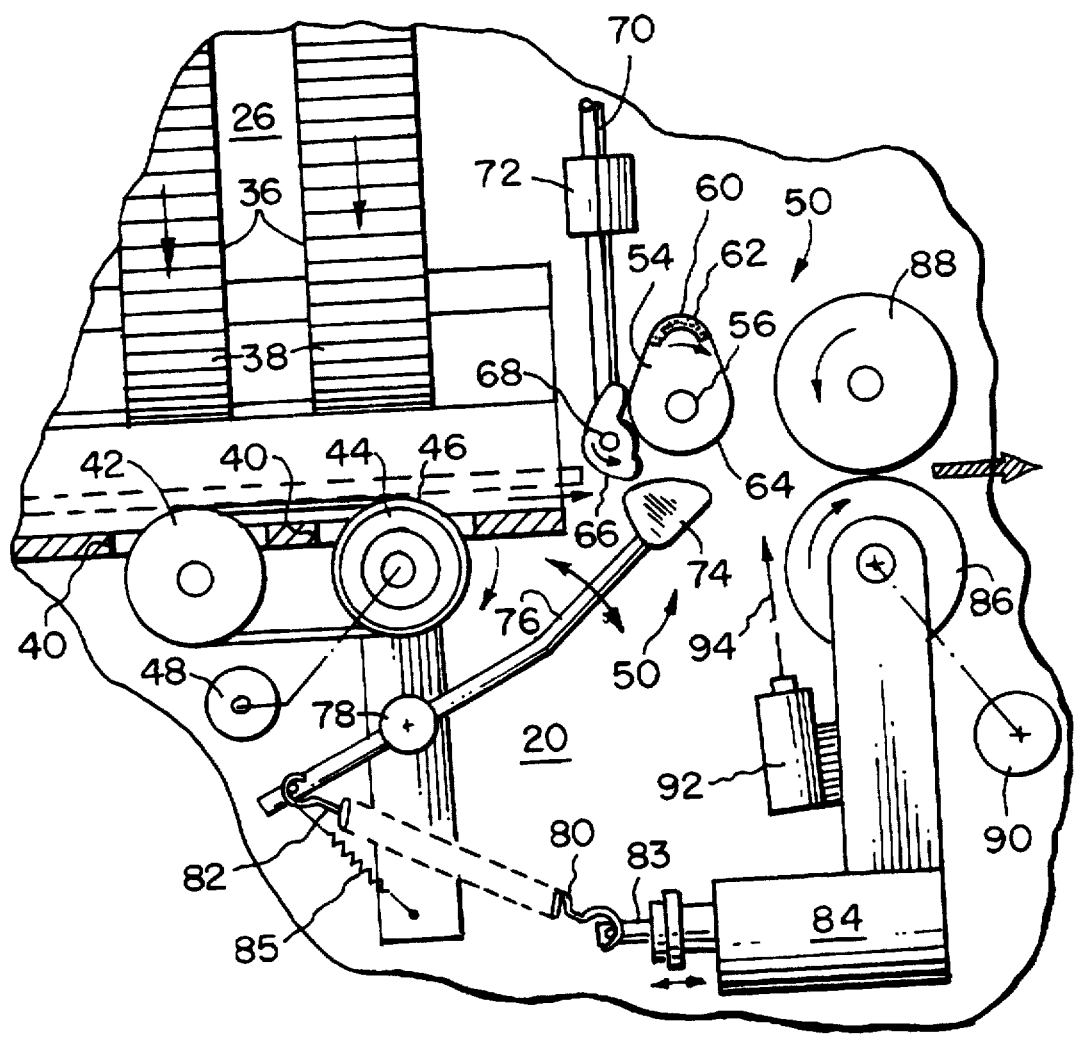
FIG. 5A is a simplified view taken in the direction of arrow A in FIG. 5 showing the layout of separator cams and fingers which are also shown in FIG. 5.

The second leg 39 of V-shaped support tray 22 includes a plurality of elongate apertures 40 which are formed therein at 90° to the longitudinal apertures 28 formed in leg 26. A pair of idler rollers 42 are journalled by way of bearings (not shown) to housing 20 such that portions of each roller 42 protrude through the elongate apertures 40. A third roller 44, also supported in housing 20 by bearings (not shown), is disposed in the remaining elongate aperture 40. A plurality of drive belts 46, for example four, are disposed between one of the rollers 42 and roller 44. Roller 44 is coupled, for example, by way of a belt/pulley combination to an electric motor 48, as best shown in FIG. 5A. Still further, a non-reversible bearing mechanism which operates like an over-running clutch is incorporated into roller 44 which permits rotation of roller 44 in one direction only (toward apparatus 50) while also allowing the roller to turn faster than its drive roller 48. Such a non-reversible bearing (over-running clutch) is available from Torrington Bearings of Torrington, Conn.

Housing 20 further includes an envelope separating/advancing apparatus 50 (best seen in FIG. 5A) for advancing a single envelope from the stack of envelopes 24 situated between sides 26 and 39 of V-shaped tray 22 while preventing the next envelope in the envelope stack from becoming lodged in the apparatus 50 and advancing simultaneously with the first envelope.

Apparatus 50 also includes a pair of separator cams 54 mounted to a shaft 56 which, in turn, is coupled to an electric motor 58. Separator cams 54 have, on the nose 62 thereof, a surface 60 which is constructed from a relatively coarse substance such as, for example a grit material. The heel 64 of separator cams 54 is constructed of a relatively smooth material such as plastic. Apparatus 50 further includes a second pair of cams 66 (grit cams) which are coated with, or manufactured from, a coarse gritty material. As best depicted in FIG. 5, grit cams 66 are journalled to a common axle 68 which is, in turn, mounted to an adjusting shaft 70. Shaft 70 is movably mounted in a mounting block 72 which carries a bearing allowing only axial movement of the shaft 70. The shaft 70 and grit cams 66, are spring-loaded to allow for back and forth axial movement along shaft 70. Final adjustment of the position of grit cams 66 is accomplished by rotation of adjusting knob 73.

Apparatus 50 also includes a pair of separator fingers 74 mounted to lever arms 76 which are, in turn, pivotally mounted to housing 20 by hub 78 so as to generally align the separator fingers 74 against grit cams 66. As best illustrated in FIG. 5A, a first spring 80 is mounted between the free end 82 of at least one of the lever arms 76 and a plunger rod 83 of solenoid 84 mounted to housing 20. An auxiliary spring 85 having very light tension is also mounted between lever arm 76 and housing 20.

Apparatus 50 also includes a pair of opposed rollers 86, 88. At least one roller, for example roller 86, is coupled to an electric motor 90 to provide for rotation, the speed of which is set to be faster than that of roller 46.

Lastly, apparatus 50 includes a photo emitter/detector ("Optos") 92 disposed in housing 20 such that the optical beam 94 generated thereby is in general alignment with the spatial area between cams 54 and rollers 86,88.

Figure 6:
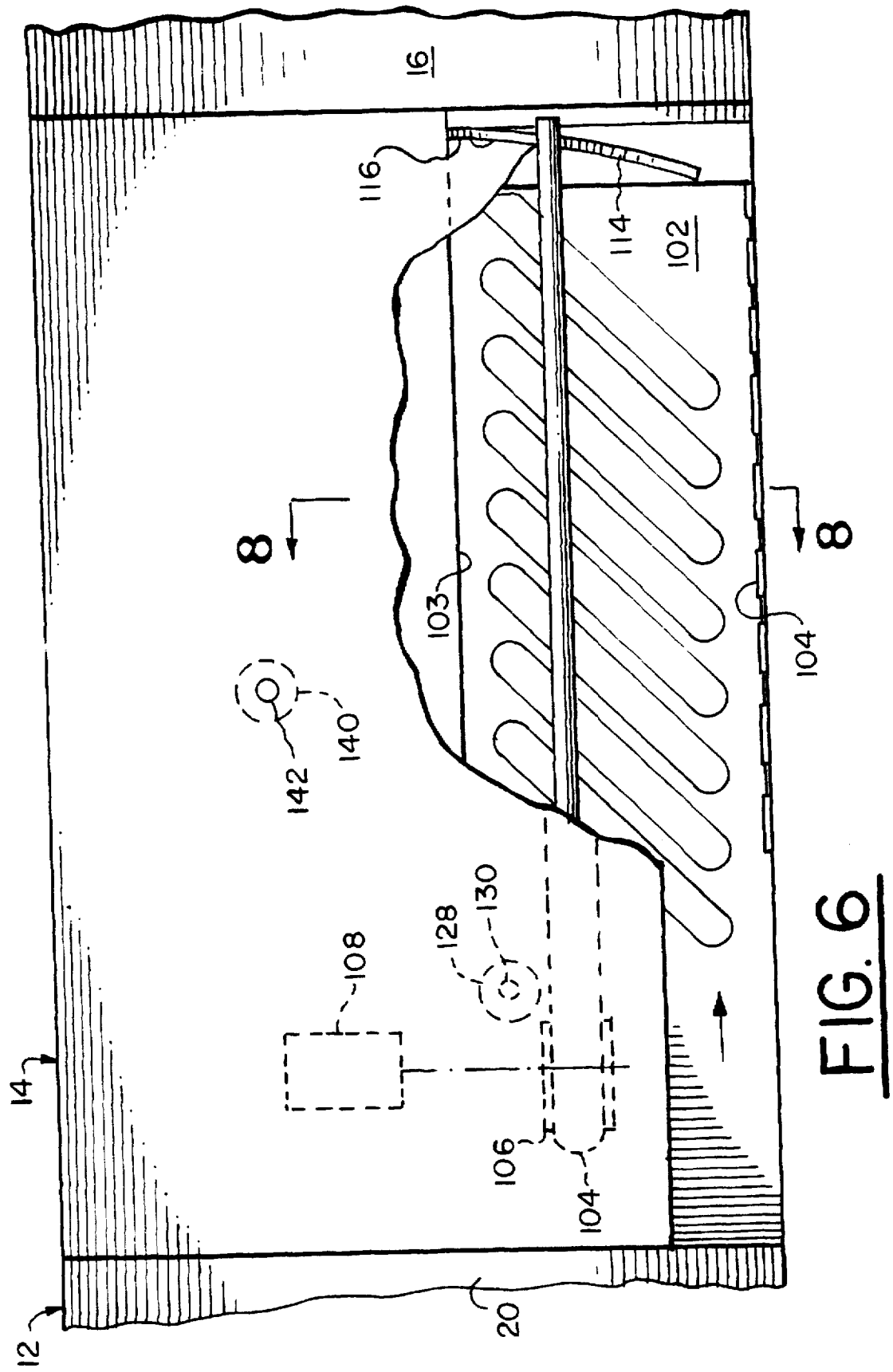
FIG. 6 is a partially broken away top plan view of the envelope weighing and transport modules of the mail processing machine illustrated in FIG. 1.
Figure 7:
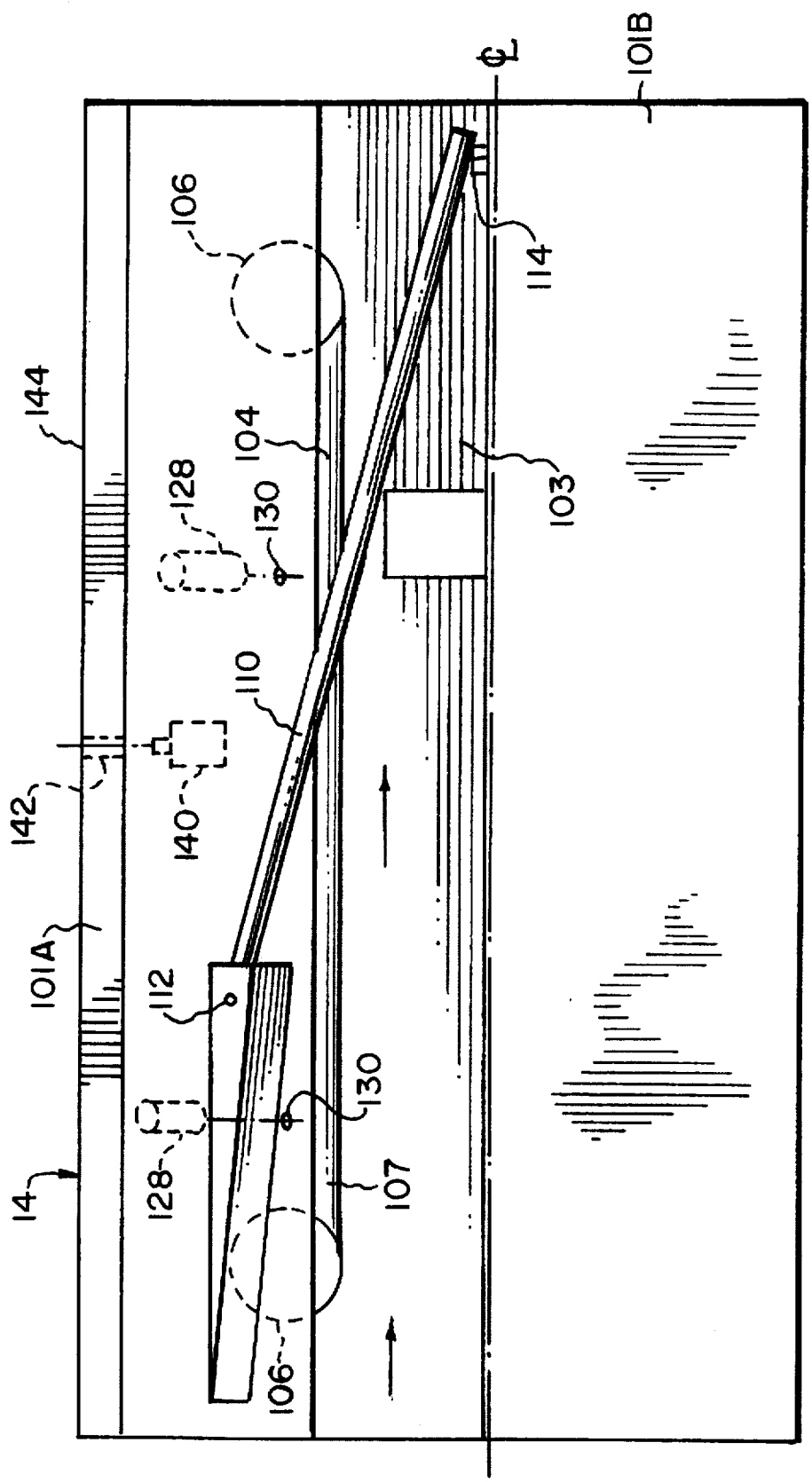
FIG. 7 is a front view of the envelope weighing and transport mode.
Figure 8A:
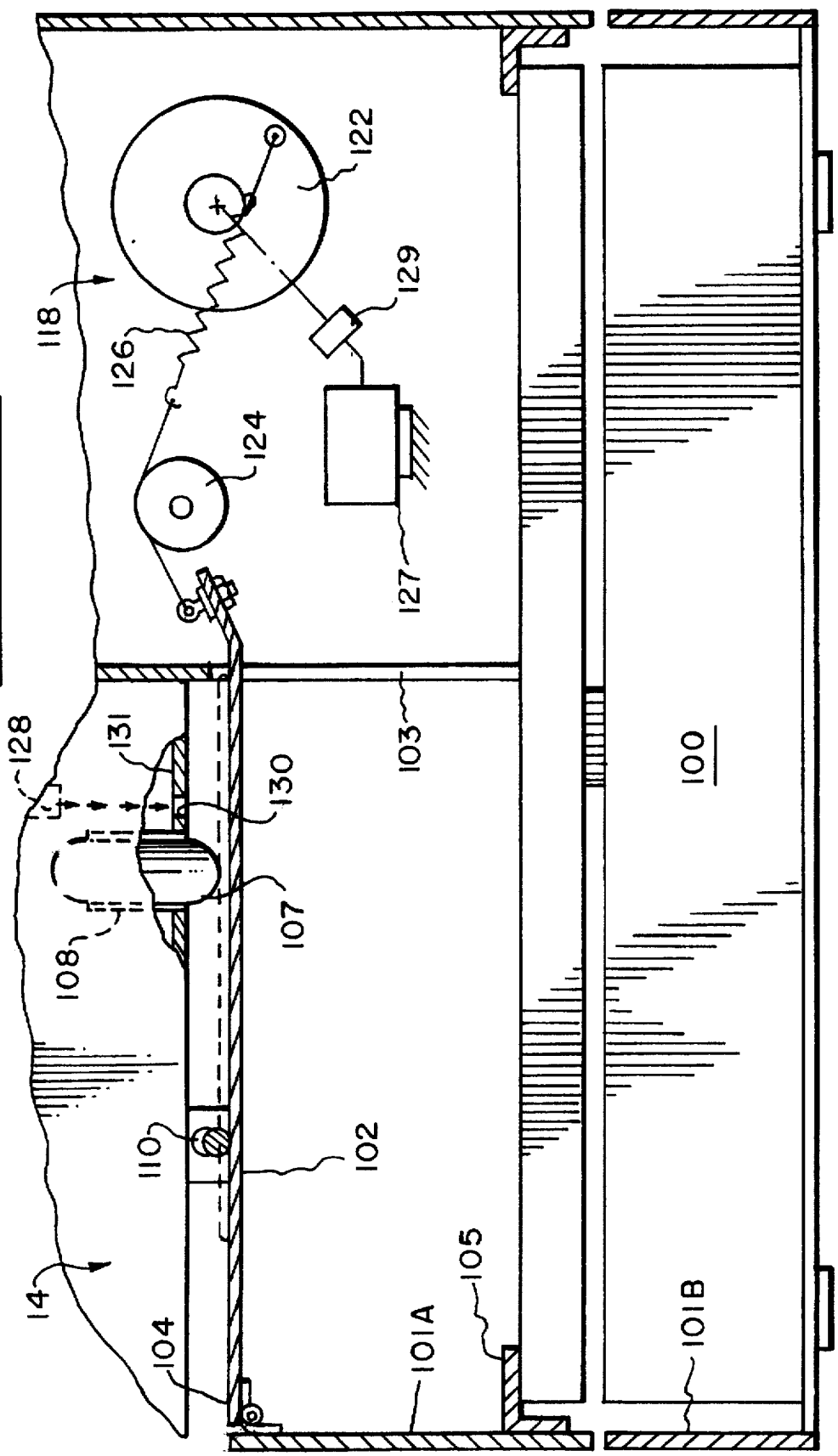
FIG. 8A is a view similar to FIG. 8 showing the pivot plate in a second operating position.

Referring now to FIG. 6–8A, where the envelope weighing and transport module 14 is shown, the module 14 includes a weigh scale 100, such as National Controls Inc. 2320 Airport Blvd. Santa Rose, Calif., their Model 7620 which is commercially available, to which scale housing 101 is mounted by way of mounting tabs 105. Housing 101 comprises an upper section 101A and a lower section 101B, both of which are entirely supported upon weigh scale 100. A pivot plate 102 is pivotally connected along edge 104 of upper section 101A of housing 101 by hinge member 106, as best seen in FIGS. 8 & 8A. A friction belt 107, such as a rubber "O"-ring belt, is disposed in upper section 101A directly above hinged plate 102 and is mounted to a pair of pulleys 108, one of which is driven at a constant speed of rotation by electric motor 109. An elongate guide rod 110 is connected to upper section 101A of housing 101 by pivot pin 112. Guide rod 110 extends from pivot pin 112 to rest upon the top surface of spring board 114 which is fixed at end 116 to upper section 101A of housing 101. The opposite end 118 of spring board 114 is disposed in close juxtaposition to hinged plate 102.

A crank and pulley system 118 is connected to hinged plate 102 through registration surface 103 opposite hinge 106, as best shown in FIGS. 8 and 8A. Specifically, a cable 120 is fixed at one end to a rotatable crank member 122 and at its opposite end to hinge member 102. Cable 120 engages and passes over guide pulley 124 and includes a spring member 126. Crank member 122 is coupled to motor 127 to provide rotation thereto. A pair of photo emitter/detectors ("Optos") 128 are disposed in the upper portion 101A of housing 101 (see also FIGS. 6 & 7) such that beams emitted therefrom pass through apertures 130 formed in plate 131. A further photo emitter/detector 140 is mounted within upper section 101A of housing 101 such that a beam emitted therefrom passes through aperture 142 formed in upper plate/top surface 144 thereof.

In operation, a stack of envelopes 24 which may contain envelopes of various sizes and weights randomly distributed in the stack, is loaded by an operator onto V-shaped envelope support tray 22 of stacking and feeder station 12 in which gravity locates the envelopes on legs 26 and 39 of tray 22. Lever arm 33 is positioned such that weighted roller 35 rests on the top envelope and, accordingly, presses down on the envelope stack 24. One edge of each envelope included in the envelope stack 24 is engaged by friction belts 36 while the flat surface of the bottom most envelope of the stack engages and rests on idler roller 42 and drive belts 46. The operator, positioned in front of computer console 18 inputs information pertinent to the envelope stack 24 and begins processing of each envelope, which process may be entirely automatic or semi-automatic dependant upon the nature of the envelopes being processed.

Figure 2:
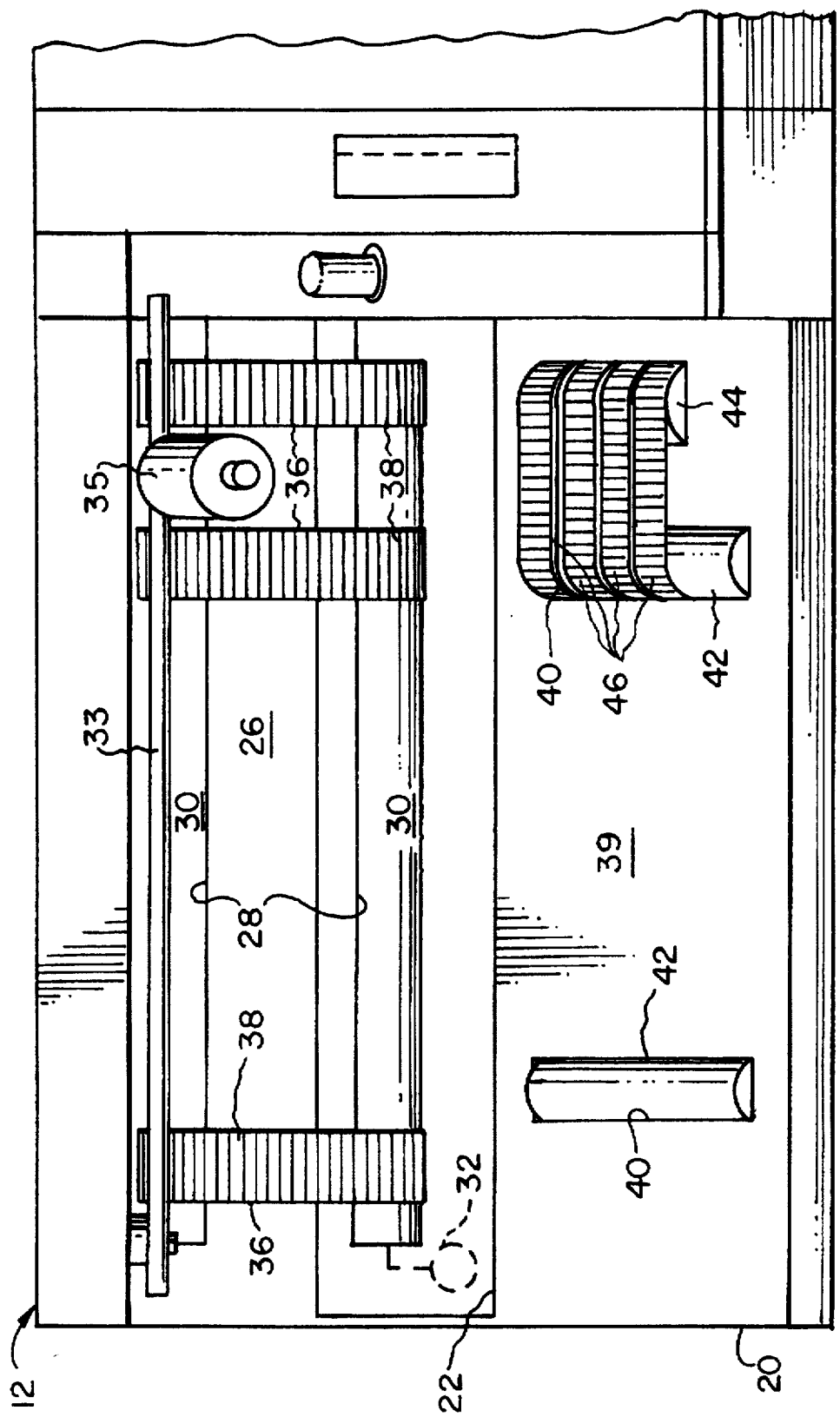
FIG. 2 is a fragmented top plan view of the machine of FIG. 1 showing he envelope stacking and feeder module.
Figure 3:
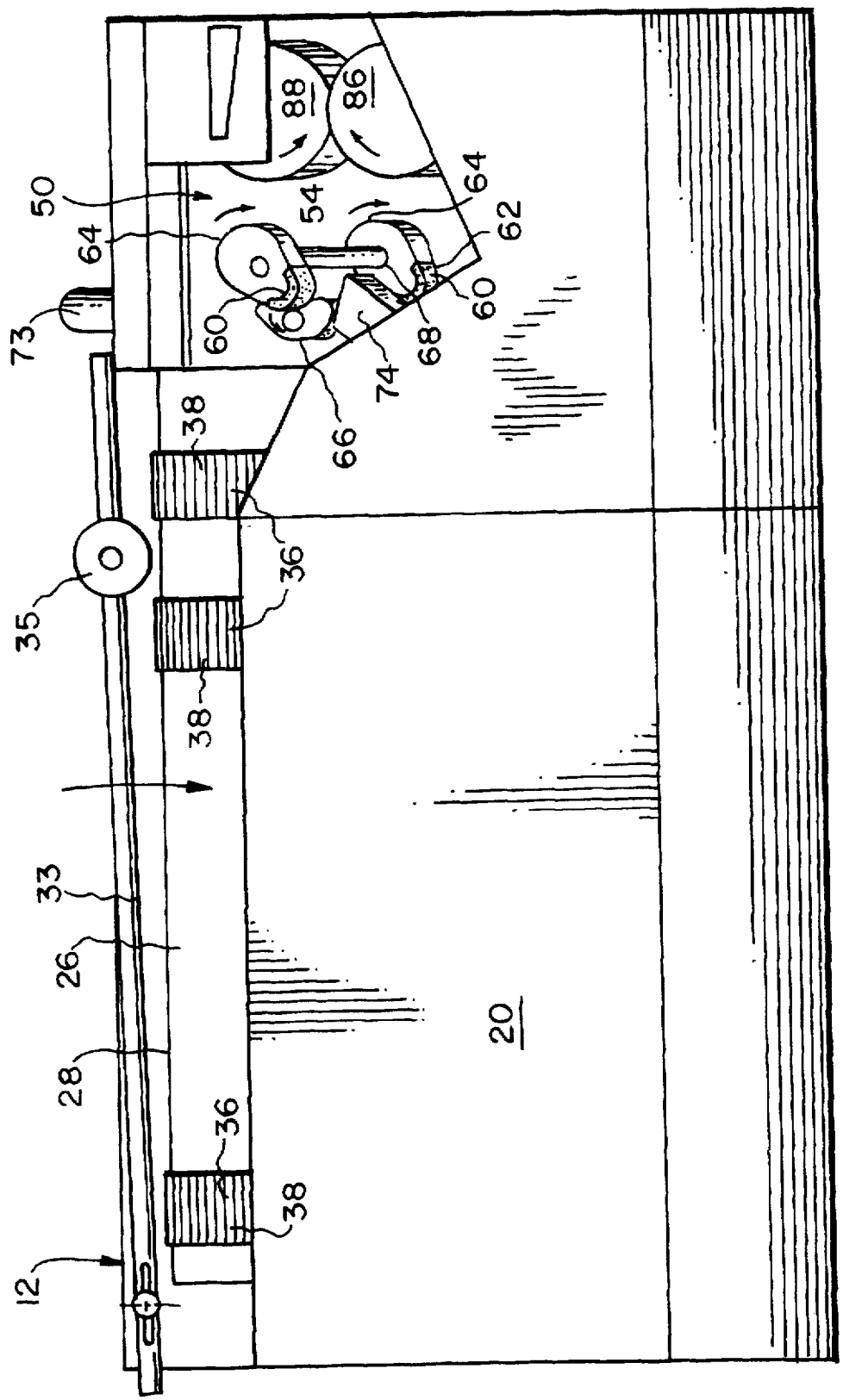
FIG. 3 is a front view of the module shown in FIG. 2.
Figure 4:
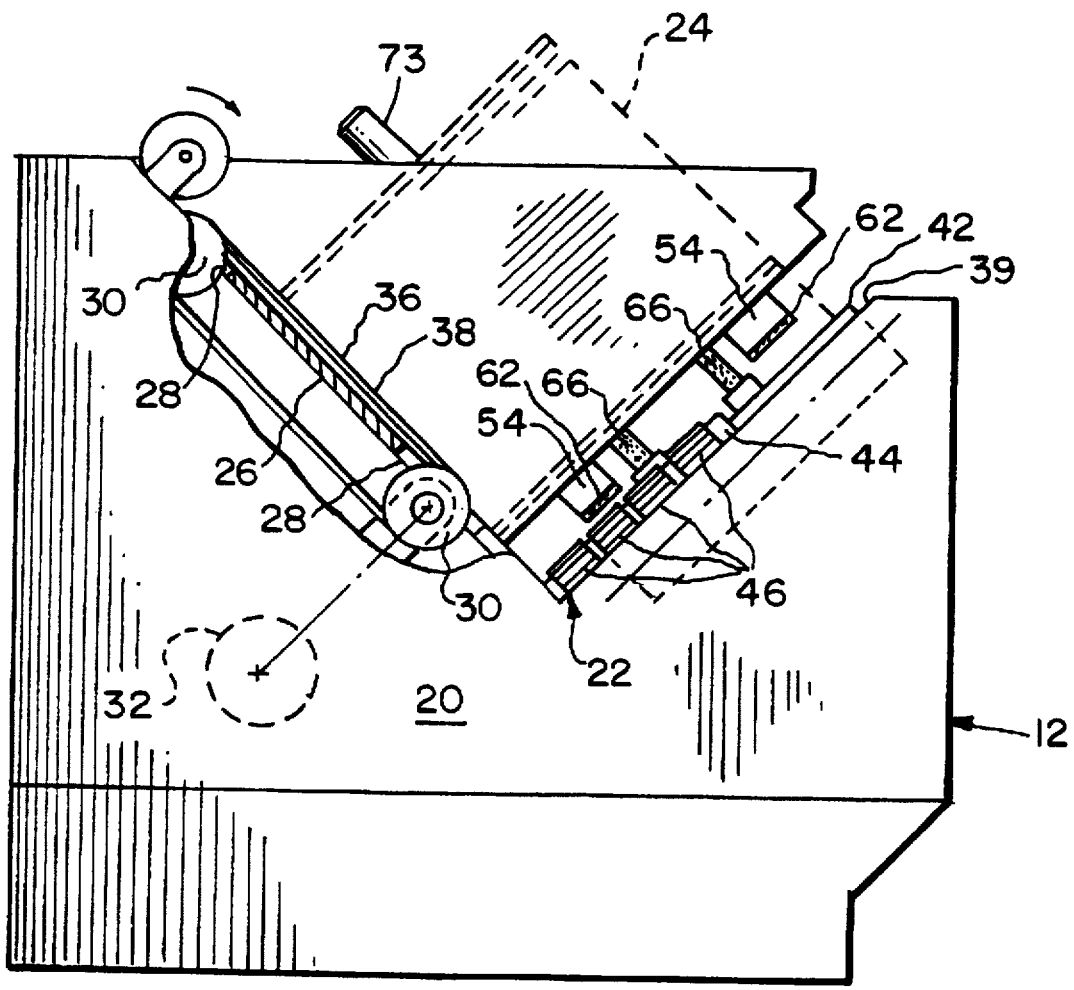
FIG. 4 is a partially broken away end view of the module shown in FIG. 3 taken from the left in FIG. 1.
Figure 5B:
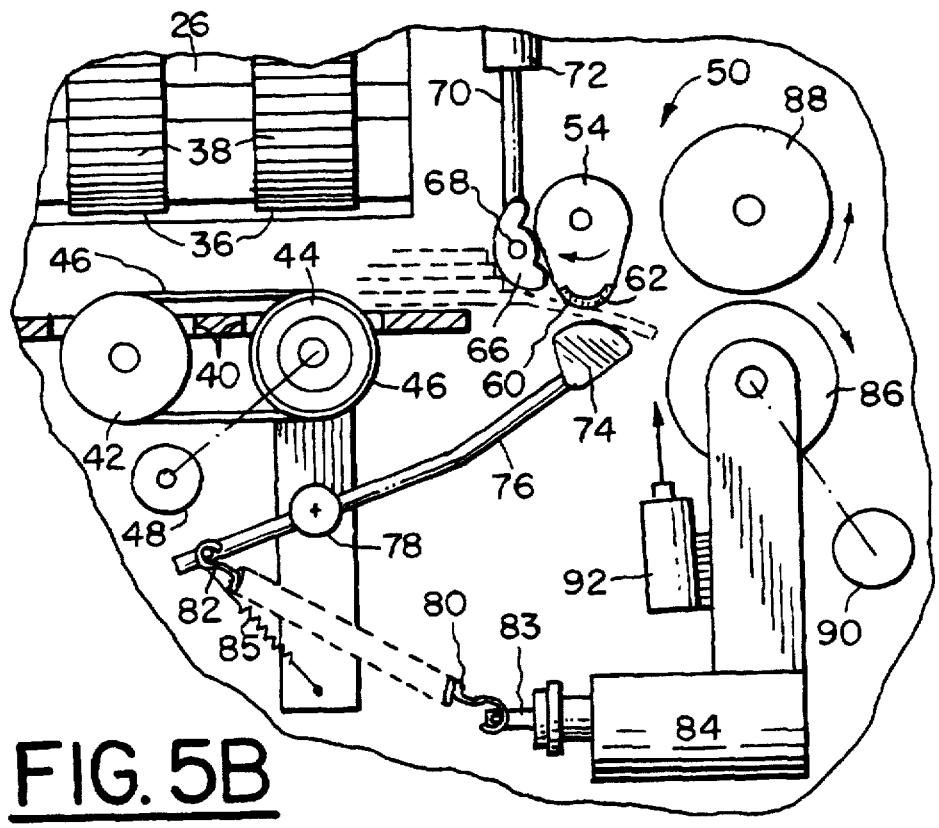
FIGS. 5B and 5C are views similar to FIG. 5A showing the separating cams and fingers in successive operating positions.
Figure 5C:
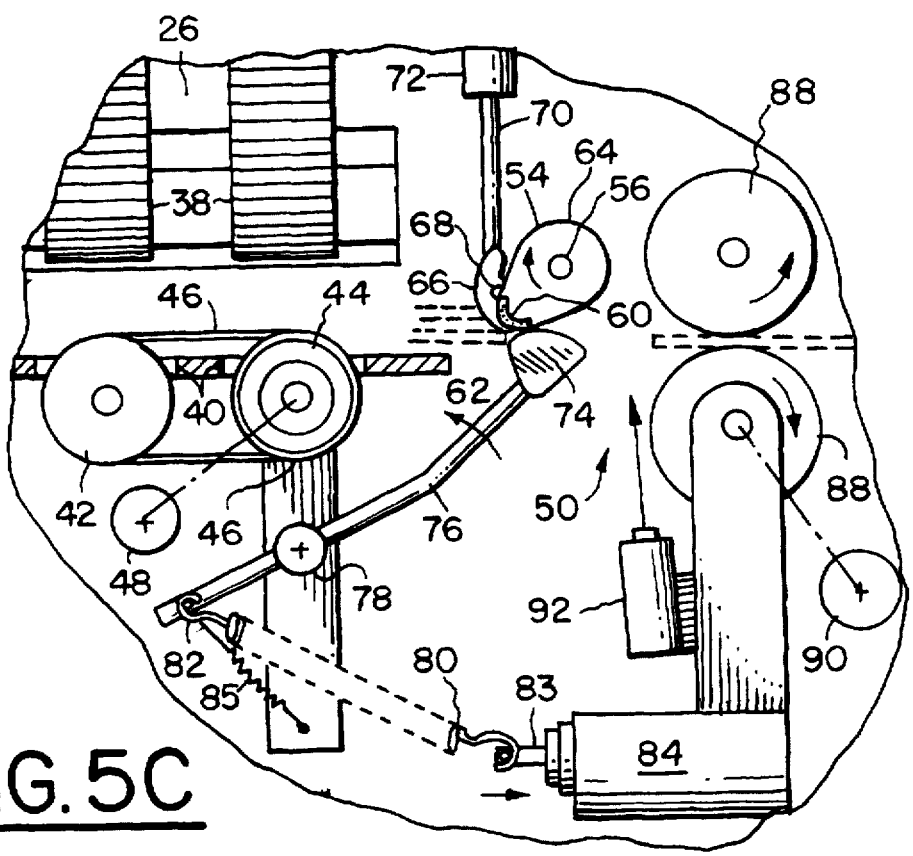

By referring to FIGS. 2 & 4, it will be evident that the edges of the envelopes in stack 24 rest against belts 36 while their flat surfaces are supported upon one of the idler rollers 42 and belts 46 mounted between the other idler roller 42 and powered roller 44. As belts 36 are revolving, the envelopes supported thereon are migrating downward toward leg 39 of V-shaped tray 22. Simultaneously, roller 44 powered by motor 48 rotates in a direction toward apparatus 50. As best illustrated in FIGS. 5A–5C, it will be evident that the first, or bottom, envelope in stack 24 drive engages drive belt 46 mounted between idler roller 42 and powered roller 44. The frictional engagement between drive belts 46 and the envelope causes the envelope to move laterally toward grit cams 66 and separator cams 54 of apparatus 50. As the advancing envelope is propelled along the linear path toward the module 14, it first encounters and passes between spring-biased grit cams 66 and separator fingers 74.

As shown in FIGS. 5A–5C, grit cams 66 are mounted to shaft 68 and are capable of pivoting slightly in a direction toward roller 86, 88 while resisting any reverse rotation. Since the grit cams 66 have a rounded contour and are spring-loaded, each advancing envelope is permitted to pass below grit cams 66 and engage separator fingers 74 which are pivotally mounted to lever arms 76. While the remaining envelopes in the stack are arranged fan-like against the contoured surface of cams 66, as shown in FIGS. 5B&C. Lever arms 76 are connected by a primary spring 80 to solenoid 84, and by a secondary spring 85 to housing 20. As the envelope progresses between grit cams 66 and separator fingers 74, plunger rod 83 of solenoid 84 is initially in its extended position and spring 80 is relaxed such that it exerts very little or no tension on arm 76. However, secondary spring 85 exerts a slight amount of spring tension on lever arm 76 in order to hold separator fingers 74 against grit cams 66. The tension is light enough to enable the advancing envelope to pass between grit cams 66 and separator fingers 74 while preventing the next envelope from moving along with the first.

In other words the first envelope in the stack is free to move along the envelope path between cams 54 and 66 and fingers 74 because there is little spring tension holding the separator fingers 74 against grit cams 66 and the force exerted by rotating belts 46 on the advancing envelope is sufficient to overcome that. Further, the smooth-surfaced portion 64 of cam 54 is adjacent the advancing envelope and offers little resistance.

While the first envelope is moving along its linear path between grit cams 66 and separator fingers 74, separator cams 54 are simultaneously rotating in a direction opposite to the direction of rotation of roller 44 as shown in FIG. 5B. The timing of the rotation of cams 54 is such that smooth-surfaced base 64 is adjacent the envelope as it travels along the linear path to the outlet end of module 12. Separator cams 54 also continue to rotate, thereby bringing the rough-surfaced nose 62 into contact with the next envelope in stack 28, as best seen in FIG. 5C. The texture of the rough surface 62, together with the counter-revolution of cams 54 applies a force to the next envelope in the stack opposing the travel of the first envelope being processed, which is at the bottom of the stack.

As the first envelope passes between cams 54 and 66 and fingers 74 it is introduced to, and gripped by opposing (pinch) rollers 86, 88, which are rotating at a speed greater than feed roller 44. The opposing rollers 86, 86 engage the envelope and pass it along to module 14. The passage of the envelope to module 16 is sensed by beam 94 generated by photo emitter/detector ("Optos") 92. That is, detector 92 determines optically that an envelope is in position in the envelope pathway. Upon such determination, and after a delay for processing the output signal of the detector, solenoid 84 is activated and plunger 83 engaged which tensions spring 80 thereby pivoting lever arms 76 about pivot 78. Separator cams 74 are forced into engagement against grit cams 66 closing the envelope pathway. By so doing, a further check is created to ensure that no additional envelopes are introduced to the pathway. However, once the envelope has exited the first module 12 and is transferred to the next module 14, plunger arm 83 of solenoid 84 is released thereby relaxing tension from spring 80. The next envelope in stack 24 is then driven by drive belts 46 mounted to powered roller 44 between grit cams 66 and separator fingers 74 where the operation described above is repeated. Cams 54, as well as roller 44, are coupled to motor 48 via a single revolution clutch (not seen) such that each cam 44 rotates one full revolution in synchronously with the other thereby further assuring that only one envelope at a time is processed from the stack.

Roller 44 includes the previously described over-running clutch which permits it to rotate only in the same direction as the envelope and to attain same speed as the envelope. The envelope speed is now determined by the speed of pinch rollers 86, 88. As powered roller 86 is rotating faster than belts 46, when the envelope being processed engages pinch rollers 86,88 the linear speed of the envelope becomes greater than the peripheral speed of belts 46. The speed of the envelope then can reach and match the speed of rollers 86,88. Thus, the envelope is pulled from belts 46 as the belts are driven by roller 44, and the envelope is forcefully ejected toward module 14. As roller 44 is mounted to the previously mentioned over-running clutch, the speed of the roller can accelerate so that it matches that of the envelope being ejected by rollers 86,88.

Upon exiting the first module 12, the envelope being processed is delivered to weighing module 14. As previously described, this is accomplished by rotating rollers 86, 88 at a speed sufficient to forcibly pull the envelope from belts 46, and between cams 54, 66 and fingers 74 and to eject the envelope onto pivot plate 102 of weighing module 14. The envelope is preferably ejected by rollers 86, 88 with such velocity that it is thrown across pivot plate 102, as best shown in FIG. 7, where it is deflected downwardly by guide rod 110 against spring board 114. Spring board 114 absorbs the impact of the deflected envelope and because the spring board 114 is angled to the left, "bounces" the envelope back into proper registration on pivot plate 102 which, as shown in FIG. 8, is disposed at an angle from horizontal. Thus, as the envelope is thrust back from spring board 114 gravity forces the envelope down and against a fixed registration surface 103 on the rear of the housing 101 of module 14.

A pair of photo emitter/detector units ("Optos") 128 (as best seen in FIGS. 6 & 7) are disposed within the upper portion 101A of housing 101 such that sensor beams emitted therefrom pass through apertures 130 of bottom plate 131. Depending upon the physical size of the envelope being processed, the sensor beam being emitted from at least one, or both, of the detector units 128 will be blocked by the envelope when it is in registration against surface 103. That is, either one or both sensor beams will detect an envelope in position and cause one or both detector units 128 to produce an electrical signal which instructs the scale to send a weigh reading to the computer 18. Also belt 107 drive motor 109 is energized. The envelope is then ejected to the indicia printing module 16. Upon stable reading, the computer (after a delay after the detector 128 has detected an envelope) send a signal to a controller which energizes motor 127 and a solenoid activated clutch 129 to rotate crank 122. Also belt 107 drive motor 109 is energized. The envelope is then ejected to the indicia printing module 16.

Cable 120 passes over idler pulley 124 and couples crank 122 to pivot plate 102. As crank 122 rotates, cable 120 pulls pivot plate 102 from its rest position, shown in FIG. 8 to its active position shown in FIG. 8A. The tension on cable 120 is maintained by spring 126 which also dampens vibration and automatically adjusts the spacing between the plate 102 and the belt 107 for thickness of envelope of the plate 102. The envelope is pinched between the rotating belt 107 and the plate 102. Belt 107 is constructed from a material such as rubber which, when engaged against the envelope, overcomes the frictional contact between the envelope and pivot plate 102 thereby causing the envelope to be driven along the linear path which continues from the outlet end of module 12, and ejected from the weigh station 14 to the indicia applying station 16. Once the envelope is cleared from the pivot plate 102, such condition is recognized by detector units 128 which signal crank 122 (via the deenergization of the motor 127 and clutch 129) to return plate 120 to its rest position illustrated in FIG. 8 thereby returning plate 102 to its down location away from rotating belt 107. Weighing module 14 is then ready to receive the next envelope being separated from stack 24 by the apparatus 50 of the first module 12.

In addition to processing envelopes of mixed sizes and weights, the automatic mail processing machine of the present invention is further capable of weighing and processing large and bulky packages which may weigh up to about 70 pounds. For example, if during processing of envelopes, it becomes necessary to weigh a package of some substantial size and weight, it is only necessary for the operator to interrupt the envelope processing stage by inputting appropriate commands by way of the computer terminal 18. The bulky package is then placed on the upper surface 144 of weigh scales housing 101. The light beam being emitted by photo detector 140 through aperture 142 is interrupted. An electronic-signal generated in response to the package being placed on the upper surface 144 of weigh module 14 activates sensor 140 and commands the indicia applying station 16 to create a tape with all information appropriate to the package. The tape is ejected from slot 150 of station 16 ready for application by the operator to the package.

Figure 9:
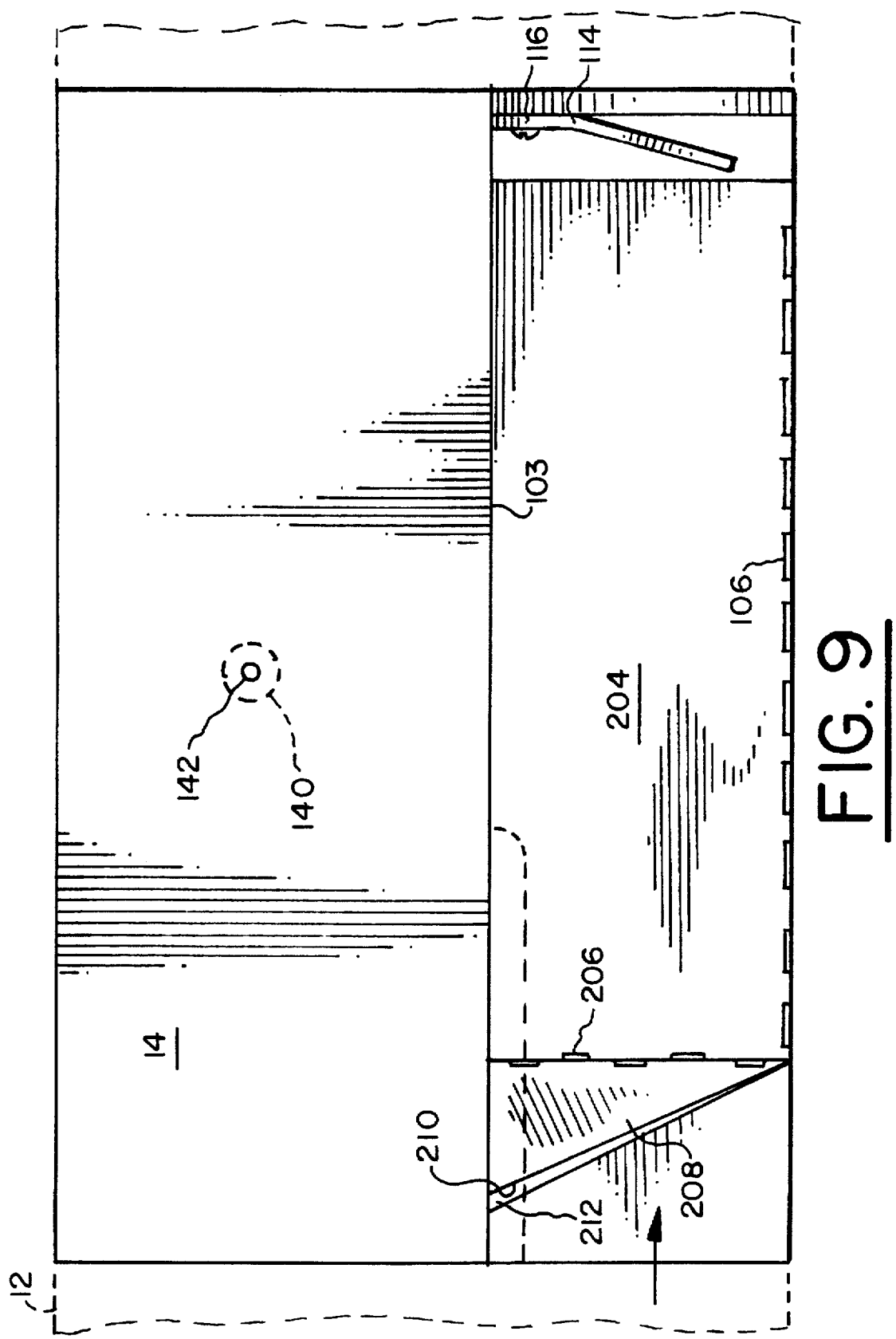
Figure 11:
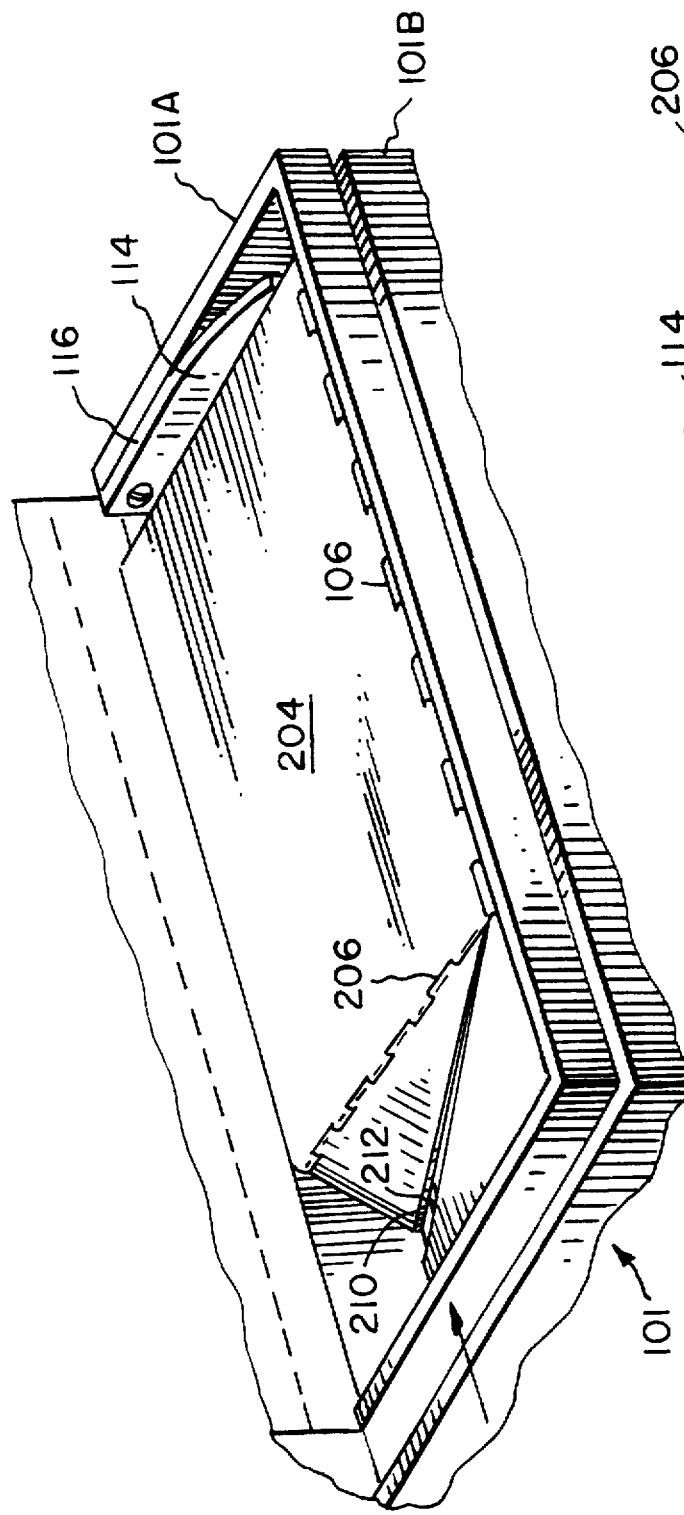
Figure 11A:
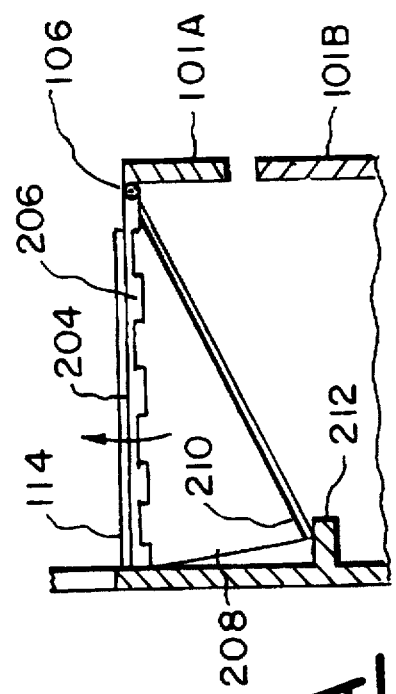

A further embodiment of the present invention is disclosed in FIGS. 9-11 A wherein the envelope weighing and transport module 14 includes a double hinged pivot plate 204 which is fixed along one edge to upper section 101 A of housing 101 by way of hinge 106. Pivot plate 204 includes a second hinge 206 disposed generally across plate 204 as shown in FIG. 9. A flap 208 is coupled to plate 204 by way of hinge 206. One edge 210 of flap 208 rests upon guide rail 212 of upper section 101 A of housing 101. As shown in FIGS. 10 & 10 A pivot plate 204 and hinged flap 208 form a continuous planar surface when plate 204 is pivoted down, such as would be the case when receiving an envelope form module 12 for registering and weighing. In this mode, pivot plate resembles the previously described unitary pivot plate 102. However, when pivot plate 204 is pivoted to the upward position, as shown in FIGS. 11 & 11 A, portion 208 which rests on guide rail 212 pivots downwardly about hinge 206. The angled position assumed by flap 208, when plate 204 is in its up position, creates an inclined ramp.

Accordingly in this embodiment, just as in the previous embodiment, when pivot plate 204 is down, envelopes may be fed from envelope feeder module 12 diverted by spring board 114 for registration and then weighed. After weighing of the envelope pivot plate 204 is pivoted up, as in the previous embodiment, where the envelope is engaged by rotating friction belt 107 and ejected to module 16. When it is desired to process a stack of envelopes having the same size and weights, it may be desirable to have the envelopes not be individually weighed before they are passed to the indicia applying module 16. In the previously described embodiment, as each individual envelope is being fed into the weigh module 14, the pivot plate 102 is in the down position such that the envelope to be weighed strikes spring board 114. Therefore, it did not matter that the leading edge of pivot plate 102 (the edge closest to feeder module 12) was blunt, as the envelopes being fed had no chance of hitting and being deflected by that edge. However, when envelopes of the same size and weights are being continually processed across the weigh module 14 without stopping to be weighed, it is important that no such edges are present on the pivot plate. The double-hinged pivot plate 204 described in this alternate embodiment presents a plate which may be left in the up position for continual envelope processing. If an envelope being fed from module 12 does encounter flap 208, it will be deflected onto plate 204 as flap 208 acts as a ramp to guide the envelope. The incoming envelope will be properly disposed on plate 204 where it is automatically contacted by rotating belt 107 and ejected onto module 16.

It will be appreciated that all input signals from the sensors are processed in a controller (not shown) and which is mounted in the housing of the module 12 (but may alternatively be mounted on the other module 14). The controller then outputs signals for operating solenoids, clutches and motor and interfaces with the computer so that the computer can read and control the weighing and postage printing operations.

Various modifications can be made to the invention as described above without departing from the spirit and scope of the invention. Accordingly, the foregoing description should be interpreted as illustrative and not in a limiting sense.

I claim:

1. An automatic mailing machine comprising a plurality of linearly disposed envelope processing modules including a) a first module for vertically stacking envelopes and linearly transferring individual envelopes from said stack, said first module including means for linearly transferring envelopes from said stack, and means for preventing more than one envelope from being transferred linearly;

b) a second module for receiving and weighing said envelope being linearly transferred from said first module, said second module including means for registering said linearly transferred envelope for weighing thereof, and means for linearly transferring said envelopes to a further mail processing module, in which said means for registering said linearly transferred envelope comprises means for deflecting the transferred envelope from said first module to a registration surface on said second module for weighing thereof; and c) a third module for receiving envelopes transferred from said second module, said third module including means for applying indicia to said envelope.

2. The automatic mailing machine as set forth in claim 1 wherein said first module includes a v-shaped tray having first and second legs in which the stack of envelopes are located against said second leg by aid of gravity, said first leg having a pair of spaced apart roller assemblies with drive belts mounted therebetween for contacting the edges of said envelopes, said second leg having a drive roller and an idler roller and a plurality of belts mounted therebetween for contacting the flat surfaces of said envelopes, said drive roller rotating said belts linearly thereby translating said envelopes toward said second module.

3. An automatic mailing machine comprising a plurality of linearly disposed envelope processing modules including a first module for vertically stacking envelopes and linearly transferring individual envelopes from said stack, said first module including means for linearly transferring envelopes from said stack, and means for preventing more than one envelope from being transferred linearly;

a second module for receiving and weighing said envelope being linearly transferred from said first module, said second module including means for registering said linearly transferred envelope for weighing thereof, and means for linearly transferring said envelopes to a further mail processing module;

a third module for receiving envelopes transferred from said second module, said third module including means for applying indicia to said envelope;

said first module includes a v-shaped tray, one leg of which includes a pair of spaced apart roller assemblies having drive belts mounted therebetween for contacting the edges of said envelopes, the other leg of said v-shaped tray including a drive roller and an idler roller and a plurality of belts mounted therebetween for contacting the flat surfaces of said envelopes, said drive roller rotating said belts linearly thereby translating said envelopes toward said second module; and said means for preventing more than one envelope from being transferred comprises first cam means having a coarse surface defined thereon for engaging one surface of a linearly transferred envelope, a pivotally mounted spring-biased separator member disposed generally opposite said first cam means to engage the opposite surface of said linearly transferred envelope and second cam means disposed in juxtaposition to said first cam means and rotating in a direction counter to said roller linearly driving said belts, said second cam means having a coarse surface defined on the nose thereof to engage and prevent any additional envelopes in said envelope stack from being linearly transferred along with the envelope being processed.

4. The automatic mailing machine as set forth in claim 3 wherein said spring-biased separator member is coupled to and pivoted by a solenoid activated in conjunction with the passage of said envelope along its linear path so as to bring said separator member into engagement against said first cam means as said envelope is linearly transferred along its path from between them.

5. The automatic mailing machine as set forth in claim 4 wherein said drive roller powering said linear drive belts and said second cam means are synchronously coupled to each other for synchronous revolution.

6. The automatic mailing machine as set forth in claim 4 wherein said solenoid is activated by way of a photo detector which senses the passage of the envelope being transferred.

7. The automatic mailing machine as set forth in claim 3 and further including a pair of oppositely disposed pinch rollers juxtaposed to said first and second cam means and said separator member, said pinch rollers being rotated at a speed greater than the speed of said drive roller carrying said linear drive belts.

8. The automatic mailing machine as set forth in claim 7 wherein said first cam means is adjustably mounted to permit adjustable location with respect to separator member.

9. The automatic mailing machine as set forth in claim 8 wherein said first cam means is contoured so as to engage the edges of the envelopes in the envelope stack and to array them in a fan-shape array so as to assist in feeding the next envelope in the stack along the linear envelope path.

10. The automatic mailing machine as set forth in claim 1 wherein said second module includes means for receiving and registering envelopes transferred from said first module for weighing thereof, and means for transferring said envelope to said third module after weighing thereof.

11. The automatic weighing machine as set forth in claim 10 wherein said second module includes a weigh scale on which the receiving and registering and transferring means are mounted.

12. The automatic mailing machine as set forth in claim 11 wherein said deflecting means comprises means for diverting said envelopes as they are fed thereonto from said first module into engagement against spring means mounted to said second module, said spring means directing said envelope against said registration surface on said second module for weighing thereof.

13. The automatic mailing machine as set forth in claim 12 wherein said diverting means comprises a diverter bar pivotally mounted to said second module so as to engage the upper surface of said envelopes as same are fed from said first module.

14. The automatic mailing machine as set forth in claim 12 wherein said spring means comprises a spring bar mounted to said second module at the end opposite the point of entry of said envelopes.

15. An automatic mailing machine comprising a plurality of linearly disposed envelope processing modules including a first module for vertically stacking envelopes and linearly transferring individual envelopes from said stack, said first module including means for linearly transferring envelopes from said stack, and means for preventing more than one envelope from being transferred linearly;

a second module for receiving and weighing said envelope being linearly transferred from said first module, said second module including means for registering said linearly transferred envelope for weighing thereof, and means for linearly transferring said envelopes to a further mail processing module;

a third module for receiving envelopes transferred from said second module, said third module including means for applying indicia to said envelope;

said second module includes means for receiving and registering envelopes transferred from said first module for weighing thereof, means for transferring said envelope to said third module after weighing thereof, and a weigh scale on which the receiving and registering and transferring means are mounted; and said second module is composed of an upper portion and a lower portion and said means for transferring said envelopes to said third module after weighing thereof comprises a plate pivotally connected to said upper portion along a front edge thereof, said plate being coupled to means for pivoting same about said pivotal connection toward and away from said upper portion, and ejection means mounted to said upper portion for contacting said envelopes being transferred when said plate is pivoted upwardly.

16. The automatic mailing machine as set forth in claim 15 wherein said ejection means comprises a elongate belt mounted between a pair of pulleys, said belt being driven at a generally constant speed by said pulleys so as to frictionally engage said envelopes as said plate is pivoted toward said upper portion and to eject said envelopes to said third module.

17. The automatic mailing machine as set forth in claim 15 wherein said upper portion includes means therein for detecting when an envelope is in registration and for causing said pivot means to pivot said plate toward said upper portion.

18. The automatic mailing machine as set forth in claim 15 wherein said pivot means connected to said plate comprises a crank mechanism coupled to said plate by way of cable such that rotation of said crank pivots said plate upward by and downwardly.

19. The automatic mailing machine as set forth in claim 15 wherein said upper portion of said second module further includes means therein for detecting the presence of a package being disposed on the top surface of said upper portion and to cause said package to be weighed by said weigh scale and said weight to be transmitted to said third module for recording and printing of information pertinent thereto.

20. The automatic mailing machine as set forth on claim 19 wherein said detector means comprises a photo detector mounted below an aperture formed in said top surface such that light beams emitted from said photo detector through said aperture enable same to detect a condition when said aperture is blocked by an object and to signal such condition to enable such object to be weighed.

21. The automatic mailing machine as set forth in claim 15 wherein said pivot plate further includes a flap member pivotally connected thereacross, said flap member pivoting in unison with the up and down pivoting of said plate by said pivot means.

22. The automatic mailing machine as set forth in claim 1 and further including a computer terminal coupled to said first, second and third modules, said modules being arrayed in a closely coupled straight line relationship to each other and said terminal being disposed in front of said modules.

23. The automatic mailing machine as set forth in claim 1 further including means coupled to said first module for applying weight to envelopes disposed on said first module to assist in transferring said envelopes.

24. The automatic mailing machine as set forth in claim 23 wherein said weight applying means comprises a pivoting lever arm having a weighted roller disposed, at one end thereof, said roller engaging said envelopes.

25. An automatic mailing machine comprising a plurality of linearly disposed envelope processing modules including
   a first module for vertically stacking envelopes and linearly transferring individual envelopes from said stack, said first module comprising means for linearly transferring envelopes from said stack, and means for preventing more than one envelope from being transferred linearly, in which said preventing means comprises first cam means having a coarse surface defined thereon for engaging one surface of a linearly transferred envelope, a pivotally mounted spring-biased separator member disposed generally opposite said first cam means to engage the opposite surface of said linearly transferred envelope and second cam means, disposed in juxtaposition to said first cam means, which rotates to engage and prevent any additional envelopes in said envelope stack from being linearly transferred along with the envelope being processed;
   a second module for receiving and weighing said envelope being linearly transferred from said first module, said second module comprising means for registering said linearly transferred envelope for weighing thereof, and means for linearly transferring said envelopes to a further mail processing module; and
   a third module for receiving envelopes transferred from said second module, said third module comprising means for applying indicia to said envelope.

26. The automatic mailing machine as set forth in claim 25 wherein said spring-biased separator member is coupled to and pivoted by a solenoid activated in conjunction with the passage of said envelope along its linear path so as to bring said separator member into engagement against said first cam means as said envelope is linearly transferred along its path from between them.

27. The automatic mailing machine as set forth in claim 26 wherein said solenoid is activated by way of a photo detector which senses the passage of the envelope being transferred.

28. The automatic mailing machine as set forth in claim 25 wherein said means of said first module for linearly transferring envelopes from said stack comprises a plurality of roller driven linear belts adjacent to said stack, and said roller driven linear belts and said second cam means are synchronously coupled to each other for synchronous revolution.

29. The automatic mailing machine as set forth in claim 25 wherein said first module further comprises a pair of oppositely disposed pinch rollers juxtaposed to said first and second cam means and said separator member, said pinch rollers being rotated to move said envelope to said second module.

30. The automatic mailing machine as set forth in claim 25 wherein said first cam means is adjustably mounted to permit adjustable location with respect to separator member.

31. The automatic mailing machine as set forth in claim 25 wherein said first cam means is contoured so as to engage the edges of the envelopes in the envelope stack and to array them in a fan-shape array so as to assist in feeding the next envelope in the stack along its linear envelope path.

32. An automatic mailing machine comprising a plurality of linearly disposed envelope processing modules including
   a first module for vertically stacking envelopes and linearly transferring individual envelopes from said stack, said first module comprising means for linearly transferring envelopes from said stack, and means for preventing more than one envelope from being transferred linearly;
   a second module for receiving and weighing said envelope being linearly transferred from said first module, said second module comprising means for registering said linearly transferred envelope for weighing thereof, and means for linearly transferring said envelopes to a further mail processing module;
   a third module for receiving envelopes transferred from said second module, said third module including means for applying indicia to said envelope; and
   said first module having a v-shaped tray with first and second legs for supporting said envelope stack, said first leg having means for driving the edges of said envelopes facing said first leg toward said second leg, and said second leg having means for linearly driving the flat surfaces of said envelopes facing said second leg toward said second module in which the envelopes in the stack are located against said second leg by aid of gravity.

33. The automatic mailing machine as set forth in claim 32 wherein said means for driving the edges of said envelopes further comprises a pair of spaced apart roller assemblies having drive belts mounted therebetween for contacting the edges of said envelopes.

34. The automatic mailing machine as set forth in claim 32 wherein said means for linearly driving the flat surfaces of said envelopes further comprises a drive roller and an idler roller and a plurality of belts mounted therebetween for contacting the flat surfaces of said envelopes, said drive roller rotating said belts linearly thereby translating said envelopes toward said second module.

35. An automatic mailing machine for weighing individual envelopes which are received in the mailing machine comprising:

a plate on which each said envelope is weighed;

a scale for weighing each said envelope when on said plate;

a surface adjacent to said plate for registering each said envelope upon said plate;

means for deflecting each said envelope onto said plate against said surface as the envelope is received; and means for transporting each said envelope off said plate after the envelope on said plate is weighed by said scale.

* * * * *